United States Patent [19]

Kobayashi et al.

[11] Patent Number: 4,905,020

[45] Date of Patent: Feb. 27, 1990

[54] THERMAL PRINT HEAD

[75] Inventors: Yozo Kobayashi; Norihito Mochizuki, both of Fuji; Hisao Suzuki; Shinichi Mizushima, both of Mishima, all of Japan

[73] Assignee: Tokyo Electric Co., Ltd., Tokyo, Japan

[21] Appl. No.: 218,915

[22] Filed: Jul. 14, 1988

[30] Foreign Application Priority Data

| | | | |
|---|---|---|---|
| Jul. 14, 1987 | [JP] | Japan | 62-175653 |
| Sep. 16, 1987 | [JP] | Japan | 62-231680 |
| Nov. 24, 1987 | [JP] | Japan | 62-295730 |
| Jan. 14, 1988 | [JP] | Japan | 63-006398 |

[51] Int. Cl.[4] ........................ G01D 15/10; H05B 1/00; H01C 1/012; B32B 15/00

[52] U.S. Cl. ................................ 346/76 PH; 219/216; 338/308; 428/640

[58] Field of Search .................... 346/76 PH; 219/216; 338/308; 428/627, 629, 630, 640

[56] References Cited

U.S. PATENT DOCUMENTS 4,168,343 9/1979 Arai et al. .......................... 428/426

FOREIGN PATENT DOCUMENTS 55-82678 6/1980 Japan .................................. 400/120

57-25976 2/1982 Japan .................................. 400/120

*Primary Examiner*—Teresa J. Walberg

*Assistant Examiner*—Gerald E. Preston

*Attorney, Agent, or Firm*—Oblon, Spivak, McClelland, Maier & Neustadt

[57] ABSTRACT

A thermal print head comprising a sequential laminated arrangement of an insulating substrate, a heating resistance layer, an electrode layer formed in a predetermined pattern, and a protective layer. The protective layer is formed of a mixture of $Al_2O_3$ as a principal component, and $SiO_2$. The protective layer has satisfactory heat resistance, abrasion resistance, crack resistance, moisture resistance and chemical stability.

9 Claims, 4 Drawing Sheets

THERMAL PRINT HEAD

BACKGROUND OF THE INVENTION

1. Field of the Invention

The present invention relates to a thermal print head having a plurality of heating elements which are heated selectively for printing on a thermosensitive recording paper or on a recording paper through a thermosensitive ink ribbon.

2. Description of the Prior Art

An exemplary conventional thermal print head 1 is shown in FIG. 1, in which the thermal print head 1 is in contact through a recording sheet 7 with a platen 8. This thermal print head 1 comprises an alumina substrate 2, a glass glaze layer 3, a heating resistance layer 4, an electrode layer 5, and a protective layer 6 formed one over another in that order. The electrode layer 5 is formed of aluminum. In most cases, the protective layer 6 is formed of one of the following thin films.

(1) Laminated thin film of $SiO_2$ and $Ta_2O_5$ films (2) $Si_3N_4$ thin film (3) SiC thin film (4) $Al_2O_3$ thin film In FIG. 1, only a single heating element of the thermal print head 1 corresponding to a single dot is shown in a cross section. Practically, the electrode layer 5 is formed in a pattern by an etching process and the thermal print head 1 has a plurality of such heating elements.

When the thermal print head 1 of such a construction is applied to printing, a thermosensitive recording paper or a thermal transfer paper is used as the recording sheet 7, and the heating resistance layers 4 are heated selectively by selectively supplying a current through the associated electrode layers 5 to form dots at positions corresponding to the heated heating resistance layers 4. Thus, the heating resistance layers 4 are heated selectively while the platen 8 is rotated to move the recording sheet 7 relative to the thermal print head 1 to print characters on the recording sheet 7.

Recently, the printer employing the thermal print head 1 has made progressive advancement in performance including capability of high-density color printing, capability of multiplex printing and capability of graduation printing. In either printing mode, the printer must be able to operate at a high printing speed. However, the friction between the protective layer 6 and the recording sheet 7 increases with the printing speed. Moreover, in high-speed printing operation, each dot must be formed in a very short time. Accordingly, to form a clear dot in a short time, an increased voltage is applied to the heating resistance layer 4, which raises the temperature of the thermal print head 1.

Furthermore, recording sheets 7 of satisfactory quality are not necessarily used because of the situation of the user. In some cases, a recording sheet of inferior coloring sensitivity, a recording sheet having inferior surface smoothness or a special thermosensitive recording paper formed by applying a coloring material to a thick paper is used. The thermal print head 1 must be pressed against the platen 8 by a pressure substantially twice the normal pressure to obtain high-quality, clear, uniform prints such such a special recording sheet 7 is used, which further increases the friction between the protective layer 6 and the recording sheet 7, and thereby the protective layer 6 is liable to be cracked at positions corresponding to the edges of the electrode layer 5. Accordingly, the protective layer 6 must be capable of maintaining the initial performance withstanding high-speed printing and high pressure exerted thereto by the platen 8. However, the foregoing conventional protective layers (1), (2), (3) and (4) are unable to cope with various conditions resulting from high-speed printing and the use of such a special recording sheet. The disadvantages of the foregoing conventional protective layers (1) to (4) will be described hereinafter.

(1) $SiO_2/Ta_2O_5$ laminated thin film

This laminated thin film has a low hardness and is inferior in abrasion resistance, and hence the laminated thin film is unsuitable as a protective layer for high-speed printing and printing on the special recording sheet.

(2) $Si_3N_4$ thin film

This thin film is liable to be cracked at positions corresponding to the edges of the electrode layer 5 by stress induced by pressure exerted thereon because aluminum used ordinarily for forming the electrode layer 5 is soft. Accordingly, this thin film is unsuitable for use as the protective layer of a thermal print head which is often pressed against the platen by a high pressure for printing on a special recording sheet.

(3) SiC thin film

This thin film is chemically unstable and reacts easily with the coloring material of the recording sheet, and hence this thin film is liable to be abraded extraordinarily. Such a disadvantage is enhanced when the thermal head is heated at a high temperature. This thin film is inferior also in crack resistance. Accordingly, this thin film is unsuitable for both high-speed printing and printing on a special recording sheet.

(4) $Al_2O_3$ thin film

This thin film is inferior in moisture resistance, and this disadvantage becomes more conspicuous with increase in the temperature of the thermal head. Accordingly, in a thermal print head employing this thin film as a protective layer, the aluminum electrode layer is liable to be subjected to electrochemical corrosion due to the corrosive action of moisture and ions contained in the recording sheet. When the electrode layer is thus corroded, the resistance of the electrode layer increases entailing omission of dots. Accordingly, this thin film is unsuitable for use as a protective layer for a thermal print head for high-speed printing.

SUMMARY OF THE INVENTION

Accordingly, it is a first object of the present invention to provide a thermal print head incorporating a protective layer having high abrasion resistance, high crack resistance and high chemical stability.

It is a second object of the present invention to provide a thermal print head incorporating a protective layer having high heat resistance in addition to high abrasion resistance and high crack resistance.

It is a third embodiment of the present invention to provide a thermal print head incorporating a protective layer having high abrasion resistance, high crack resistance, high moisture resistance and high chemical stability.

DETAILED DESCRIPTION OF THE PREFERRED EMBODIMENTS

Figure 2:
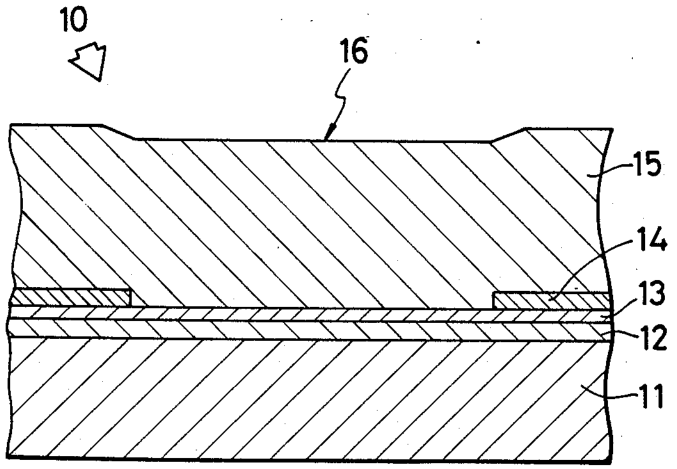
FIG. 2 is a fragmentary longitudinal sectional view of a thermal print head, in a first embodiment, according to the present invention.

First Embodiment (FIG. 2)

FIG. 2 shows a portion for one dot of a thermal print head 10 comprising an alumina substrate 11, a glass glaze layer 12, a heating resistance layer 13, an electrode layer 14 and a protective layer 15 formed in that order one over another.

The heating resistance layer 13 is a thin $BaRuO_3$ film of 1000 Å in thickness formed by a RF sputtering process.

The electrode layer 14 is a thin aluminum film of 1 $\mu$m in thickness formed by a DC sputtering process. The electrode layer 14 is formed in a predetermined pattern through a precision processing technique such as a photolithographic etching process. A portion of the heating resistance layer 13 corresponding to a removed portion of the electrode layer 14 serve as a heating element 16 for one dot. The thermal print head 100 is provided with a matrix of a plurality of heating elements 16. The size of the heating element 16 is $100 \times 120$ $\mu m^2$, and the density of the matrix is 8 elements/$mm^2$.

The protective layer 15 is a thin film of a mixture of $Al_2O_3$ and $SiO_2$ having a thickness of 5 $\mu$m formed by a RF sputtering process or an electron beam evaporation process. The mixture contains 65 mol % $Al_2O_3$ and 35 mol % $SiO_2$.

Figure 1:
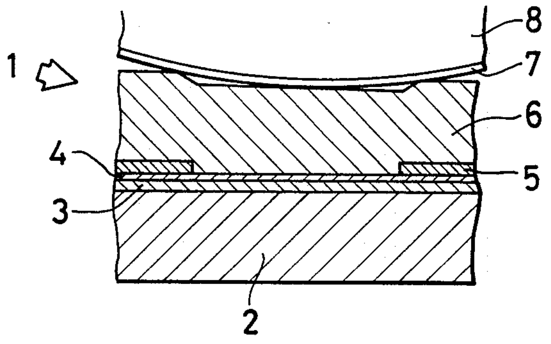
FIG. 1 is a fragmentary longitudinal sectional view of a conventional thermal print head.

The printing operation of the thermal print head 10 thus constituted is the same as that of the foregoing conventional thermal print head 1 described with reference to FIG. 1, and hence the description thereof will be omitted. The performance of the protective layer 15 of the thermal print head 10 exceeds an established standard level in respect of abrasion resistance, crack resistance, chemical stability and moisture resistance. Accordingly, the thermal print head 10 is satisfactorily applicable to high-speed printing and printing on special recording sheets. The excellent performance of the protective layer 15 will be verified hereunder on the basis of measured values.

The performance of the protective layer 15 of the thermal print head 10 was evaluated in comparison with that of the following conventional protective layers formed respectively on thermal print heads of the same construction as controls.

Control 1: Laminated thin film of $SiO_2$ and $Ta_2O_5$ (5 $\mu$m thick)

Control 2: $Si_3N_4$ thin film (5 $\mu$m thick)

Control 3: SiC thin film (5 $\mu$m thick)

Control 4: $Al_2O_3$ thin film (5 $\mu$m thick)

Vickers Hardness Test:

The Vickers hardness of the protective layer 15 and the controls 1 to 4 was measured as an indication of abrasion resistance. The measured results are tabulated in Table 1. As is obvious from Table 1, the Vickers hardness of the protective layer 15 is not very high as compared with those of the controls and is higher than that of the control 1. In practical printing operation, a protective layer having a Vickers hardness in the range of 500 to 700 kg/$mm^2$ is abraded in a short period of printing operation, and hence such a protective layer is not applicable to the thermal print head, while a protective layer having a Vickers hardness in the range of 1000 to 1200 kg/$mm^2$ is more or less satisfactory in abrasion resistance. The protective layer 15 is sufficiently abrasion resistant when applied to high-speed printing.

TABLE 1

| Protective layers | Vickers hardness (kg/$mm^2$) |
|---|---|
| Protective layer 15 | 1000 to 1200 |
| Control 1 | 500 to 700 |
| Control 2 | 1800 to 2200 |
| Control 3 | 2000 to 2500 |
| Control 4 | 1100 to 1400 |

Moisture Resistance Test:

The sample thermal print heads respectively provided with the protective layer 15 and the controls 1 to 4 were placed in a pressure cooker and were subjected to a pressure of 2 atms at a temperature of 120° C. for 48 hours. Stripes and stains such as caused by chemicals appeared only in the control 4, while the rest of the layers were not damaged at all. Only the control 4 is unacceptable in respect of moisture resistance.

Durability Test:

The durability of the sample protective layers were tested on a thermal printer through experimental high-speed printing operation using a special recording sheet having a low coloring sensitivity prepared by coating a thick paper with a white size and a color former. The sample thermal print heads were pressed against the platen by a pressure of 900 to 1000 g/$cm^2$, which is approximately twice the ordinary pressure. Energy was supplied to the sample thermal print head at an energy supply rate of 50 mJ/$mm^2$. The recording sheet was fed at a high feed speed of 75 mm/sec.

Control 1:

When the recording sheet had run about 3 km, numerous large flaws were formed in the surface, which is considered to be due to the scratching action of hard particles contained in the recording sheet and dust contained in the atmosphere. When the recording sheet run additional 18 km, the flaws reached the heating resistance layer 12 causing faulty printing. This fact agrees well with the results of the Vickers hardness test and proved that the control 1 is inferior in abrasion resistance.

Control 2:

When the recording sheet had run about 3 km, a bulge developed in a portion of the protective layer corresponding to the central portion of the heating element 16, and the bulged portion fell off when the recording sheet had run about 5 km causing faulty printing, which is considered to be due to cracks formed in portions corresponding to the edges of the electrode layer 14.

Control 3:

When the recording sheet had run about 3 km, cracks developed and the heating resistance layer 13 was damaged causing faulty printing.

Control 4:

When the recording sheet had run about 10 km, the resistance of the electrode layer 14 increased by several percent. When the recording sheet had run additional 16 km, the resistance of the electrode layer 14 increased by several tens percent and the omission of dots occurred. This fact is considered to be due to electrochemical corrosion in the electrode layer 14, which agrees well with the results of the moisture resistance test and proved that the control 4 is inferior in moisture resistance.

Protective layer 15:

Neither cracks nor bulges developed in the protective layer 15 and the resistance of the electrode layer 14 changed from the initial value merely by about 1% after the recording sheet has run 30 km. This fact proved that the protective layer 15 has a sufficiently high Vickers hardness, satisfactory moisture resistance, excellent crack resistance and excellent chemical stability.

Being inexpensive, aluminum has generally been used for forming the electrode layer 14 of the thermal print head. However, since the aluminum electrode layer 14 is highly flexible, the protective layer formed over the electrode layer 14 is liable to be strained, which is considered to be one of the causes of developing cracks in the protective layer. Nevertheless, it was confirmed through the experimental printing operation that the protective layer 15 of the present invention is not cracked even if the electrode layer 14 is formed of aluminum.

It was also confirmed experimentally that the hardness of the protective layer 15 is reduced deteriorating the abrasion resistance when the content of the $SiO_2$ is 60 mol % or higher and that the crack resistance and chemical stability is deteriorated when the content of the the same is 5 mol % or less. That is, when the $SiO_2$ content of the mixture for forming the protective layer 15 is 60 mol % or higher, the self sintering property of the mixture is deteriorated and hence it is difficult to form a sintered target for sputtering, and the hardness of the protective layer 15 formed of such a mixture is not high enough to provide a satisfactorily durable thermal print head. When the $SiO_2$ content of the mixture forming the protective layer 15 is in the range of 6 to 19 mol %, the protective layer 15 is brittle and becomes easily fissured, and hence the thermal print head provided with such a protective layer 15 is unsuitable for high-speed printing. Accordingly, it is desirable to form the protective layer 15 by a thin film containing $Al_2O_3$ as a principal component and having a $SiO_2$ content in the range of 20 to 45 mol %.

When the $SiO_2$ content of the protective layer is in the range of 6 to 19 mol %, the protective layer 15 is unsatisfactory in moisture resistance (permeable). When the electrode layer 14 is formed of inexpensive aluminum, water permeated the protective layer 15, and the reaction of aluminum electrode layer 14 with water gives aluminum hydroxide increasing the resistance of the electrode layer 14, and thereby the life time of the thermal print head is reduced. Accordingly, when the electrode layer 14 is formed of aluminum, the $SiO_2$ content of the protective layer 15 must be 20 mol % or above.

Figure 3:
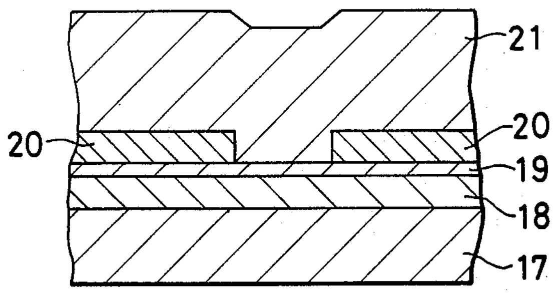
FIG. 3 is a fragmentary longitudinal sectional view of a thermal print head, in a second embodiment, according to the present invention.

Second Embodiment (FIG. 3)

A thermal print head, in a second embodiment, according to the present invention comprises an alumina substrate 17, a glass glaze layer 18, a heating resistance layer 19, an aluminum electrode layer 20 and a protective layer 21, which are formed in that order one over another.

After being formed over the substrate 17, the glass glaze layer 18 is washed, and then $BaRuO_3$ is deposited over the surface of the glass glaze layer 18 in a thin film of 1000 Å in thickness by a RF sputtering process to form the heating resistance layer 19. Aluminum is deposited over the heating resistance layer 19 in a thin film of 1 μm in thickness by a DC sputtering process to form the aluminum electrode layer 20. Then, the aluminum electrode layer 20 is patterned by a precision processing technique to expose the heating resistance layer 19 in a pattern of a plurality of dots each of 100 μm×100 μm arranged in a dot density of 8 dots/mm.

In forming the protective layer 21, first a thin film of $Al_2O_3$ and $SiO_2$ is formed in a thickness of 2 μm by a RF sputtering process using a target containing 65 mol % $Al_2O_3$ and 35 mol % $SiO_2$ in an atmosphere of argon gas, and then a thin film of $Al_2O_3$ and $SiO_2$ is formed over the former thin film in a thickness of 3 μm in an atmosphere of a mixed gas of argon gas and nitrogen gas. Nitrogen is contained in the surface of the protective layer 21. In discharge, the nitrogen content of the mixed gas is in the range of 0 to 10%.

The superiority of the protective layer 21 of the present invention to the conventional protective films (the controls 1 to 4) was verified theoretically and experimentally. The performance of the protective layer 21 was tested in comparison with the same controls 1 to 4.

Vickers hardness test:

The Vickers hardness of the protective layer 21 and the controls 1 to 4 was measured as an indication of abrasion resistance. The measured data is tabulated in Table 2.

TABLE 2

| Protective layers | Vickers hardness (kg/mm²) |
|---|---|
| Protective layer 21 | 1400 to 1700 |
| Control 1 | 500 to 700 |
| Control 2 | 1800 to 2200 |
| Control 3 | 2000 to 2500 |
| Control 4 | 1100 to 1700 |

As is obvious from Table 2, the protective layer 21 of the present invention has a sufficiently high Vickers hardness.

Durability Test:

Sample thermal print heads respectively provided with the protective layer 21 and the controls 1 to 4 were subjected to durability tests on a thermal printer. To make the comparative merits of the sample thermal print heads obvious, the sample thermal print heads were pressed against the platen by a pressure in the range of 900 to 1000 g/cm², which is twice the ordinary pressure, energy of 50 mJ/mm² was supplied to the thermal print heads, and the recording sheet was fed at a speed of 75 mm/sec.

Control 1 (5 μm):

Neither cracks nor bulges developed in the sample thermal print head provided with the control 1. However, numerous large flaws were formed in the control 1, which is considered to be due to the scratching action of hard particles contained in the recording sheet, and dust and sand contained in the atmosphere. When the recording sheet had run 18 km, the flaws in the control 1 reached the heating resistance layer 19 causing faulty printing. Obviously, the rapid abrasion of the control 1 is due to its low hardness.

Control 2 (5 μm):

When the recording sheet had run 3 km, bulges developed in the heating resistance layer 19 of the thermal print head provided with the control 2, which is considered to be due to thermal stress in the heating resistance layer 19. When the recording sheet had run 15 km, the bulges fell off causing faulty printing. Such a trouble is attributable to the inferior crack resistance of control 2.

Control 3 (5 μm):

When the recording sheet had run 3 km, cracks reaching the heating resistance layer 19 were formed in the control 3 causing faulty printing. Such a trouble is attributable to the inferior crack resistance of the SiC film.

Control 4 (5 μm):

When the recording sheet had run 10 km, the resistance of the electrode layer 20 increased by several percent, and by several tens percent when the recording sheet had run 16 km, entailing the omission of dots. Such an increase in resistance is due to the corrosion of the aluminum electrode layer 20 by the action of moisture and ions of the recording sheet penetrated the control 4.

Protective Layer 21:

All the tests proved that the protective layer 21 of the present invention is excellent in heat resistance, abrasion resistance and impact resistance. When the protective film of the present invention was formed essentially of $Al_2O_3$ and $SiO_2$, the Vickers hardness thereof was on the order of 1000 kg/mm$^2$, whereas the Vickers hardness of the protective layer of the present invention exceeded 1400 kg/mm$^2$ when nitrogen was added to the protective layer so that the nitrogen content increases toward the surface. Neither cracks nor bulges developed in the protective layer 21 and the thermal print head was able to operate normally even after the recording sheet had run 50 km.

Moisture Resistance Test:

The protective layer 21 and the controls 1 to 4 were subjected to the same moisture resistance test (pressure cooker test) as that mentioned above. Striped stains developed only in the control 4, which proved that the control 4 has an inferior moisture resistance.

Figure 4:
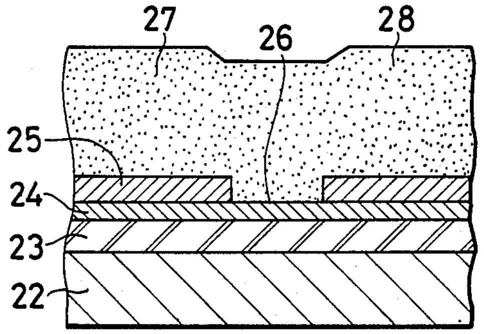
FIG. 4 is a fragmentary longitudinal sectional view of a thermal print head, in a third embodiment, according to the present invention.

Third Embodiment (FIG. 4)

A thermal print head, in a third embodiment, according to the present invention comprises an alumina substrate 22, a glass glaze layer 23, a heating resistance layer 24, an electrode layer 25 and a protective layer 28 formed in that order one over another.

The heating resistance layer 24 is formed by depositing $BaRuO_3$ in a thin film of 1000 Å in thickness over the glass glaze layer 23 by a RF sputtering process. The electrode layer 25 is formed by depositing aluminum in a thin film of 1 μm in thickness over the heating resistance layer 24 by a DC sputtering process. The electrode layer 25 is patterned by a precision processing technique to form a plurality of heating elements 26 each of 100 μm×120 μm arranged in a dot density of 8 dots/mm. The protective layer 28 is formed by depositing a thin mixed film 27 of 5 μm in thickness in an atmosphere of argon gas by a RF sputtering process using a target containing 40 mol % $Al_2O_3$, 20 mol % $SiO_2$ and 40 mol % SiC. Since the mixture of $Al_2O_3$, $SiO_2$ and SiC is inferior in self sintering property, a minute quantity of $Y_2O_3$ (yttria) or $ZrO_2$ (zirconia) may be added to the mixture.

Vickers Hardness Test:

The protective layer 28 and the same controls 1 to 3 as those mentioned above were subjected to Vickers hardness tests. The measured results are tabulated in Table 3. In this case, the control 1 consists of a thin $SiO_2$ film of 2 μm in thickness and a thin $Ta_2O_5$ film of 3 μm in thickness. The thickness of the rest of the protective layers is 5 μm. The Vickers hardness of the protective layer 28 of the present invention is in the range of 1600 to 1900 kg/mm$^2$, which is three times the Vickers hardness of the control 1.

TABLE 3

| Protective layers | Vickers hardness (kg/mm$^2$) |
|---|---|
| Protective layer 28 | 1600 to 1900 |
| Control 1 | 500 to 700 |
| Control 2 | 1800 to 2200 |
| Control 3 | 2000 to 2500 |

Durability Test:

Sample thermal print heads respectively provided with the protective layer 28 of the present invention and the controls 1 to 3 were subjected to printing tests on a printer. A special thermosensitive paper having a low coloring sensitivity and coated with a coating material containing a coloring material, a finishing material and hard particles was used as a recording sheet. In the durability tests, the thermal print heads were pressed against the platen by a pressure, in the range of 900 to 1000 g/cm$^2$, which is twice the ordinary pressure, energy of 50 mJ/mm$^2$ was supplied to the thermal print heads, and the recording sheet was fed at a running speed of 75 mm/sec.

Control 1 (5 μm):

Although neither cracks nor bulges developed, numerous large flaws were formed in the control 1 when the recording sheet had run 3 km, which is considered to be due to the scratching action of hard particles contained in the recording sheet and dust and sand contained in the atmosphere. When the recording sheet had run 18 km, the flaws reached the heating resistance layer 24 entailing faulty printing.

Control 2 (5 μm):

Bulges developed in the control 2 at positions corresponding to the centers of the heating elements when the recording sheet had run 3 km, which is considered to be due to thermal stress in the heating resistance layer 24. The bulged portions fell of causing faulty printing when the recording sheet had run 5 km.

Control 3 (5 μm):

When the recording sheet had run 3 km, cracks developed in the control 3 and the heating elements were damaged entailing faulty printing.

Protective Layer 28 (5 μm):

The protective layer 28 was found to be excellent in heat resistance and impact resistance. Neither cracks nor bulges developed in the protective layer 28, the protective layer 28 was flawed scarcely and the protective layer was abraded only by 0.8 μm when the recording sheet had run 30 km.

In a modification of the protective layer 28, the protective layer 28 was formed by a RF sputtering process using a target containing 20 mol % $Al_2O_3$, 10 mol %

$SiO_2$ and 70 mol % SiC. During the RF sputtering process, the partial pressure of oxygen was regulated to introduce oxygen into the thin film only in the initial stage of the RF sputtering process in order to form a protective layer in which the hardness of the surface is higher than that of the inner portion thereof. When the partial pressure of oxygen is increased, the $SiO_2$ content of the protective layer is reduced, and thereby the hardness of the protective layer is reduced. This protective layer is excellent in heat resistance, impact resistance and abrasion resistance and has a Vickers hardness in the range of 1800 to 2000 kg/mm$^2$. This protective layer was abraded by 0.7 μm when the recording sheet had run 30 km.

Figure 5:
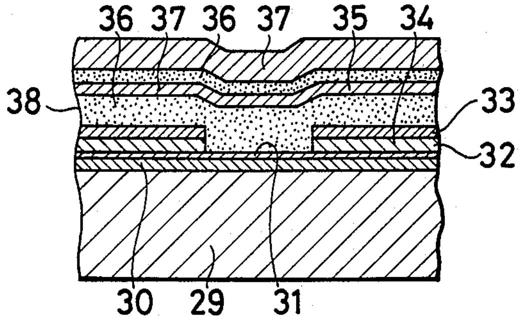
FIG. 5 is a fragmentary longitudinal sectional view of a thermal print head, in a fourth embodiment, according to the present invention.
Figure 6:
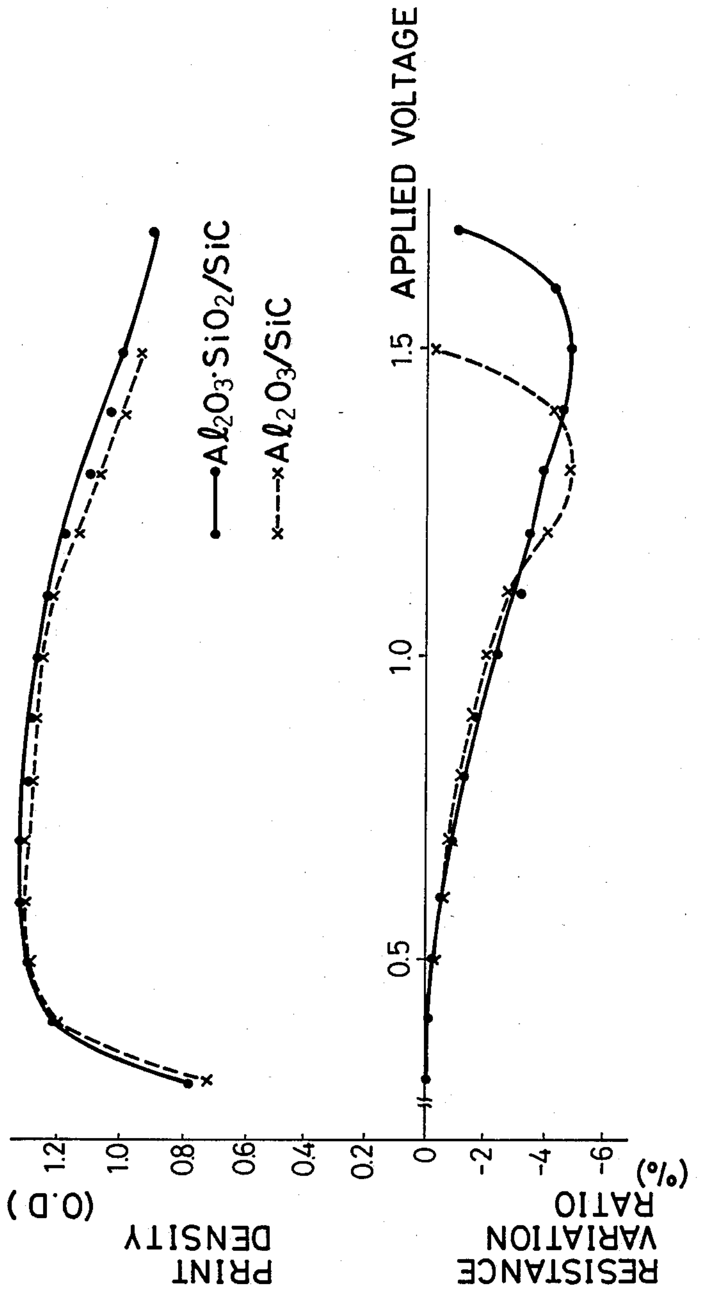
FIG. 6 is a graph showing the results of step stress tests.
Figure 7:
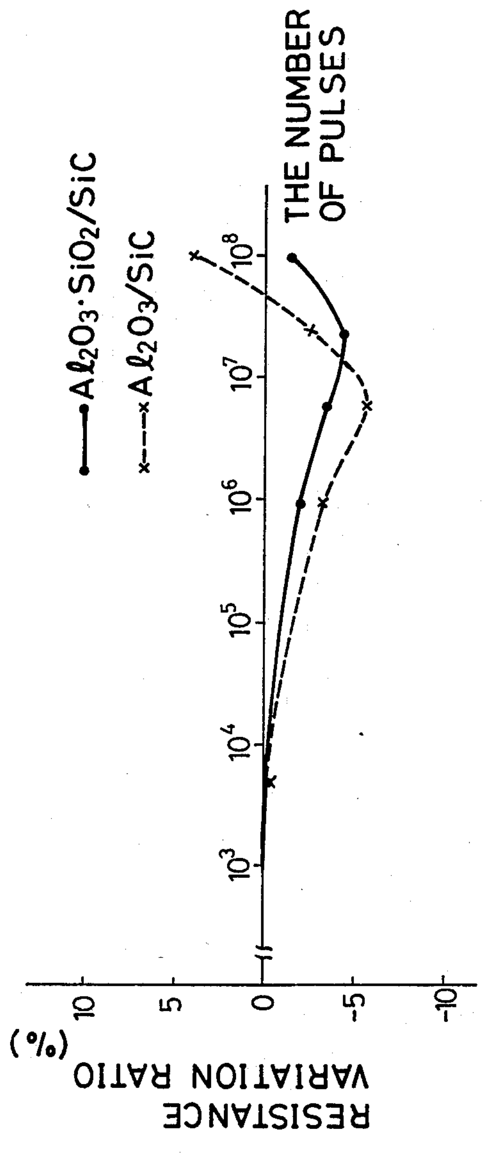
FIG. 7 is a graph showing the results of pulse endurance tests.

Fourth Embodiment (FIGS. 5 to 7)

A thermal print head, in a fourth embodiment, according to the present invention comprises a ceramic substrate 29, such as an alumina substrate, a glaze layer 30, a heating resistance layer 31, an electrode layer 34 consisting of an Al.Si lead electrode layer 32 and an aluminum lead layer 33, and a protective layer 35.

The heating resistance layer 31 is a thin $RuO_2$ film formed over the glaze layer 30 after washing the latter.

The protective layer 35 is a composite layer consisting of two laminated layers each consisting of a first layer 36 formed of a mixture of $Al_2O_3$ and a $SiO_2$, and a second layer 37 formed of SiC. The first layer 36 of the upper laminated layer is thinner than that of the lower laminated layer, while the second layer 37 of the upper laminated layer is thicker than that of the lower laminated layer.

The heating resistance layer 31 may contain a plurality of materials in addition to $RuO_2$. The use of $RuO_2$ in combination with at least one oxide of a metal M among metals Ca, Sr and Ba enhances the moisture resistance of the heating resistance layer 31. When the ratio M/Ru=1, the heating resistance layer 31 has a stable construction of $CaRuO_3$, $SrRuO_3$ or $BaRuO_3$. Although the ratio M/Ru is not limited strictly, the moisture resistance is deteriorated by the effect of $RuO_2$ when the ratio M/Ru is smaller than 0.6, the resistance increases and the temperature coefficient of resistance becomes negative when the ratio M/Ru is greater than 2, and the heating resistance layer 31 has properties similar to those of an insulating layer when the ratio M/Ru is greater than 4. Accordingly, it is desirable that the value of the ratio M/Ru is in the range of 0.6 to 2.

The heating resistance layer 31 was formed in a thin film of 800 Å in thickness by a RF sputtering process using a $MRuO_3$ target (M is Ca, Sr or Ba).

The Al.Si lead electrode layer 32 and the aluminum lead layer 33 was formed successively respectively in a thickness of 500 Å by a sputtering process, and then the lead electrode layer 32 and the lead layer 33 were patterned by a photolithographic etching process to form heating elements each of 115 μm×220 μm.

In forming the protective layer 35, the first layer 36 (2 μm) of the lower laminated layer, the second layer 37 (500 Å) of the lower laminated layer, the first layer 36 (5000 Å) of the upper laminated layer and the second layer 37 (2 μm) of the upper laminated layer were formed sequentially in that order by a RF sputtering process.

The thermal print head thus fabricated according to the present invention (sample thermal print head) and a thermal print head provided with an $Al_2O_3$ protective layer (control) were subjected to step stress tests, in which resistance variation ratio, puncture power and print density were measured.

In the step stress tests, 5000 voltage pulses of 0.95 msec in pulse width and 2.6 msec pulse period were applied to the thermal print heads while the applied power was increased gradually. The print density was saturated when the applied power increased to 0.6 W/dot. The sample thermal print head and the control were the same in the rate of increase in print density with respect to the applied power. The puncture power of the sample thermal print head was 1.7 W/dot whereas that of the control was 1.5 W/dot, which proved that the thermal print head of the present invention is applicable to high-speed printing.

To test the stability in an extended period of printing operation, voltage pulses of 0.95 msec in pulse width, 2.6 msec in pulse period and 0.5 W/dot in power were applied continuously to the sample thermal print head and the control. The results are shown in FIG. 7. As is obvious from FIG. 7, the resistance variation ratio of the thermal print head of the present invention is stable for a long period of printing operation.

What is claimed is:

1. A thermal print head comprising: an insulating substrate; a heating resistance layer formed over the insulating substrate; an electrode layer formed over the heating resistance layer in a predetermined pattern; and a protective layer formed over the electrode layer; characterized in that the protective layer is formed of a mixture of $Al_2O_3$ as a principal component, and $SiO_2$ in the range of 20 to 45 mol %.

2. A thermal print head according to claim 1, wherein said electrode layer is formed of aluminum or an aluminum-rich alloy.

3. A thermal print head comprising: an insulating substrate; a heating resistance layer formed over the insulating substrate; an electrode layer formed in a predetermined pattern over the heating resistance layer; and a protective layer formed over the electrode layer; characterized in that the protective layer is formed of a mixture containing $Al_2O_3$ and $SiO_2$ as principal components and contains nitrogen in the surface thereof.

4. A thermal print head according to claim 3, wherein the nitrogen content of the protective layer increases from the bottom toward the surface thereof.

5. A thermal print head comprising: an insulating substrate; a heating resistance layer formed over the insulating substrate; an electrode layer formed in a predetermined pattern over the heating resistance layer; and a protective layer formed over the electrode layer; characterized in that protective layer is formed of a mixture containing $Al_2O_3$, $SiO_2$ and SiC as principal components.

6. A thermal print head according to claim 5, wherein the oxygen content of the protective layer decreases from the lower side toward the upper side thereof.

7. A thermal print head comprising: an insulating substrate; a heating resistance layer formed over the insulating substrate; an electrode layer formed in a predetermined pattern over the heating resistance layer; and a protective layer formed over the electrode layer; characterized in that the heating resistance layer is formed of a thin oxide film containing ruthenium as a first principal component, and the protective layer is a composite layer formed of a laminated layer of a first layer formed of a mixture of $Al_2O_3$ and $SiO_2$ and a second layer formed of SiC.

8. A thermal print head according to claim 7, wherein the protective layer consists of a plurality of the laminated layers each of the first layer formed of a mixture of $Al_2O_3$ and $SiO_2$ and a second layer formed of SiC.

9. A thermal print head according to claim 8, wherein the thickness of the second layer of the laminated layer nearer to the surface of the protective layer is greater than that of the second layer of the laminated layer farther from the surface of the protective layer.

* * * * *